United States Patent
Zhang et al.

(10) Patent No.: US 11,673,582 B1
(45) Date of Patent: Jun. 13, 2023

(54) CONTROL ALLOCATION SYSTEM FOR PATH TRACKING IN A VEHICLE

(71) Applicant: GM Global Technology Operations LLC, Detroit, MI (US)

(72) Inventors: Yubiao Zhang, Sterling Heights, MI (US); Nikolai K. Moshchuk, Grosse Pointe Farms, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/542,680

(22) Filed: Dec. 6, 2021

(51) Int. Cl.
  *B60W 60/00* (2020.01)
  *B60W 50/02* (2012.01)
  *B60W 50/04* (2006.01)
  *B60W 40/13* (2012.01)

(52) U.S. Cl.
  CPC ...... *B60W 60/00186* (2020.02); *B60W 40/13* (2013.01); *B60W 50/0225* (2013.01); *B60W 50/045* (2013.01); *B60W 2040/1315* (2013.01); *B60W 2510/18* (2013.01); *B60W 2510/20* (2013.01); *B60W 2520/12* (2013.01); *B60W 2520/14* (2013.01)

(58) Field of Classification Search
  CPC ........... B60W 60/00186; B60W 40/13; B60W 50/0225; B60W 50/045; B60W 2040/1315; B60W 2510/18; B60W 2510/20; B60W 2520/12; B60W 2520/14
  See application file for complete search history.

(56) References Cited

U.S. PATENT DOCUMENTS

| | | | |
|---|---|---|---|
| 8,903,607 B2 | 12/2014 | Lee et al. | |
| 9,573,623 B2 | 2/2017 | Moshchuk et al. | |
| 2009/0319114 A1* | 12/2009 | Takenaka | B60W 10/04 701/48 |
| 2013/0253793 A1* | 9/2013 | Lee | B60W 50/029 701/70 |
| 2018/0024552 A1* | 1/2018 | She | B60W 50/0098 701/23 |
| 2018/0043931 A1* | 2/2018 | Gupta | B62D 11/02 |
| 2018/0273005 A1* | 9/2018 | Redder | B60T 8/885 |
| 2018/0362022 A1* | 12/2018 | Kasaiezadeh Mahabadi | B60W 30/045 |
| 2019/0324450 A1* | 10/2019 | Lurie | H04L 9/3236 |
| 2021/0016785 A1* | 1/2021 | Nakagawa | B60W 50/045 |

(Continued)

*Primary Examiner* — Sze-Hon Kong
(74) *Attorney, Agent, or Firm* — Vivacqua Crane, PLLC (57) ABSTRACT

A control allocation system for a vehicle includes an electric power steering (EPS) system, one or more redundant actuation systems for controlling a plurality of wheels of the vehicle, and one or more controllers in electronic communication with the EPS system and the one or more redundant actuation systems. The one or more controllers execute instructions to determine tracking errors and vehicle dynamics states based on a plurality of local path planning references and receive a fault signal indicating the EPS system is non-functional. In response to receiving the fault signal, the one or more controllers determine a plurality of corrective constraints in real-time. The one or more controllers solve a real-time constrained optimization problem for each sampling interval of the control allocation system to determine a plurality of control actions based on the plurality of corrective constraints and the tracking errors.

20 Claims, 4 Drawing Sheets

(56) References Cited

U.S. PATENT DOCUMENTS

| | | | |
|---|---|---|---|
| 2021/0094560 A1* | 4/2021 | Wu | B60W 10/16 |
| 2021/0370943 A1* | 12/2021 | Jung | B60T 17/221 |
| 2022/0363274 A1* | 11/2022 | McGregor | B60W 50/023 |
| 2022/0363276 A1* | 11/2022 | Wulf | B60W 50/029 |
| 2022/0371653 A1* | 11/2022 | Irie | B62D 15/0285 |

* cited by examiner

CONTROL ALLOCATION SYSTEM FOR PATH TRACKING IN A VEHICLE

INTRODUCTION

The present disclosure relates to a control allocation system for guiding a vehicle along a planned path of travel when an electric power steering (EPS) is non-functional. More particularly, the disclosed control allocation system leverages existing actuators when the EPS system is non-functional to guide the vehicle along the planned path of travel in real-time.

Semi-autonomous and autonomous vehicles are becoming more ubiquitous on the road. An autonomous vehicle executes various path planning algorithms that determine a planned path of travel the vehicle may follow. Additionally, an autonomous vehicle also includes an electric power steering (EPS) system that includes an electric motor driven by a software-driven steering module as well as a torque sensor for measuring the driver inputs.

Sometimes the electric motor of the EPS system may become non-functional and may not operate normally because of excessive heat or infiltration of water, dirt, or other contaminants. In some instances, the steering module may no longer operate because of issues with the electronic board or circuitry that is part of the steering module. Moreover, the torque sensor, especially a contacting-style torque sensor, may become non-functional in some instances as well. Furthermore, sometimes the EPS system may exhibit decreased performance and may be unable to deliver a requested command. In the event the EPS is no longer functional, it may be challenging to control the vehicle to follow the planned path, even if a driver attempts to manually control the vehicle.

Thus, while current systems achieve their intended purpose, there is a need in the art for an improved system addressing a path tracking gap in the event the EPS system becomes non-functional.

SUMMARY

According to several aspects, a control allocation system for a vehicle including an electric power steering (EPS) system is disclosed, and includes one or more redundant actuation systems for controlling a plurality of wheels of the vehicle and one or more controllers in electronic communication with the EPS system and the one or more redundant actuation systems. The one or more controllers execute instructions to determine tracking errors and vehicle dynamics states based on a plurality of local path planning references. The one or more controllers execute instructions to receive a fault signal indicating the EPS system is non-functional. In response to receiving the fault signal, the one or more controllers execute instructions to determine a plurality of corrective constraints in real-time for controlling the EPS system and the one or more redundant actuation systems. The one or more controllers execute instructions to solve a real-time constrained optimization problem for each sampling interval of the control allocation system to determine a plurality of control actions based on the plurality of corrective constraints and the tracking errors. The one or more controllers execute instructions to distribute the plurality of control actions to the one or more redundant actuation systems.

In an aspect, the controller executes instructions to determine a state space formulation based on the tracking errors, the vehicle dynamics states, and tire lateral forces, where the state space formulation includes high-level control variables and an actuator Boolean matrix.

In another aspect, the actuator Boolean matrix indicates the one or more redundant actuation systems available in the vehicle for guiding the vehicle when the EPS system is non-functional.

In yet another aspect, the plurality of corrective constraints are determined based on the high-level control variable.

In an aspect, the fault signal includes a fault code signifying a condition that caused the EPS system to become non-functional.

In another aspect, the fault signal includes one or more of the following: an EPS fault flag, an EPS faulty mode message, a faulty steering angle message, and EPS operating bounds message.

In an aspect, the plurality of corrective constraints include a corrective equality constraint and a corrective bound constraint.

In another aspect, the one or more redundant actuation systems for controlling a plurality of wheels of the vehicle include at least one of the following: an active rear steering (ARS) system, a combined torque vectoring (TV) and differential braking (DB) system, or both the ARS system and the combined TV and DB system.

In yet another aspect, the tracking errors include a lateral distance error and a heading orientation error, and the vehicle dynamics states include vehicle lateral speed and yaw rate.

In an aspect, the plurality of control actions include a front road wheel angle, a rear road wheel angle, and an external yaw moment at a center of gravity of the vehicle.

In another aspect, the plurality of control actions instructing the one or more redundant actuation systems to guide the vehicle along a planned path of travel when the EPS system is non-functional.

In an aspect, a method of determining control actions for guiding a vehicle along a planned path of travel by a control allocation system is disclosed. The method includes determining, by one of more controllers of the vehicle, tracking errors and vehicle dynamics states based on a plurality of local path planning references. The method also includes receiving, by the one or more controllers, a fault signal indicating the EPS system is non-functional. In response to receiving the fault signal, the method includes determining a plurality of corrective constraints in real-time for controlling the EPS system and one or more redundant actuation systems. The method further includes solving a real-time constrained optimization problem for each sampling interval of the control allocation system to determine a plurality of control actions based on the plurality of corrective constraints and the tracking errors. Finally, the method includes distributing the control actions to one or more redundant actuation systems for controlling a plurality of wheels of the vehicle.

In an aspect, the method further comprises determining a state space formulation based on the tracking errors, the vehicle dynamics states, and a tire lateral force approximation, where the state space formulation includes high-level control variables and an actuator Boolean matrix.

In another aspect, the actuator Boolean matrix indicates the one or more redundant actuation systems available in the vehicle for guiding the vehicle when the EPS system is non-functional.

In an aspect, control allocation system for a vehicle including an EPS system is disclosed, and includes one or more redundant actuation systems for controlling a plurality of wheels of the vehicle, where the one or more redundant actuation systems include at least one of the following: an ARS system, a combined TV and DB system, and both the ARS system and the combined TV and DB system. The system also includes one or more controllers in electronic communication with the EPS system and the one or more redundant actuation systems. The one or more controllers execute instructions to determine tracking errors and vehicle dynamics states based on a plurality of local path planning references. The one or more controllers execute instructions to determine a state space formulation based on the tracking errors, the vehicle dynamics states, and a tire lateral force, wherein the state space formulation includes high-level control variables and an actuator Boolean matrix. The one or more controllers execute instructions to receive a fault signal indicating the EPS system is non-functional. In response to receiving the fault signal, the one or more controllers determine a plurality of corrective constraints in real-time for controlling the EPS system and the one or more redundant actuation systems. The one or more controllers execute instructions to solve a real-time constrained optimization problem for each sampling interval of the control allocation system to determine a plurality of control actions based on the plurality of corrective constraints and the tracking errors. Finally, the one or more controllers execute instructions to distribute the control actions to the one or more redundant actuation systems.

In an aspect, the actuator Boolean matrix indicates the one or more redundant actuation systems available in the vehicle for guiding the vehicle when the EPS system is non-functional.

In another aspect, the fault signal includes a fault code signifying a condition that caused the EPS system to become non-functional.

In yet another aspect, the fault signal includes one or more of the following: an EPS fault flag, an EPS faulty mode, a faulty steering angle message, and EPS operating bounds message.

In an aspect, the plurality of corrective constraints includes a corrective equality constraint and a corrective bound constraint.

In another aspect, the plurality of control actions includes a front road wheel angle, a rear road wheel angle, and an external yaw moment at a center of gravity of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
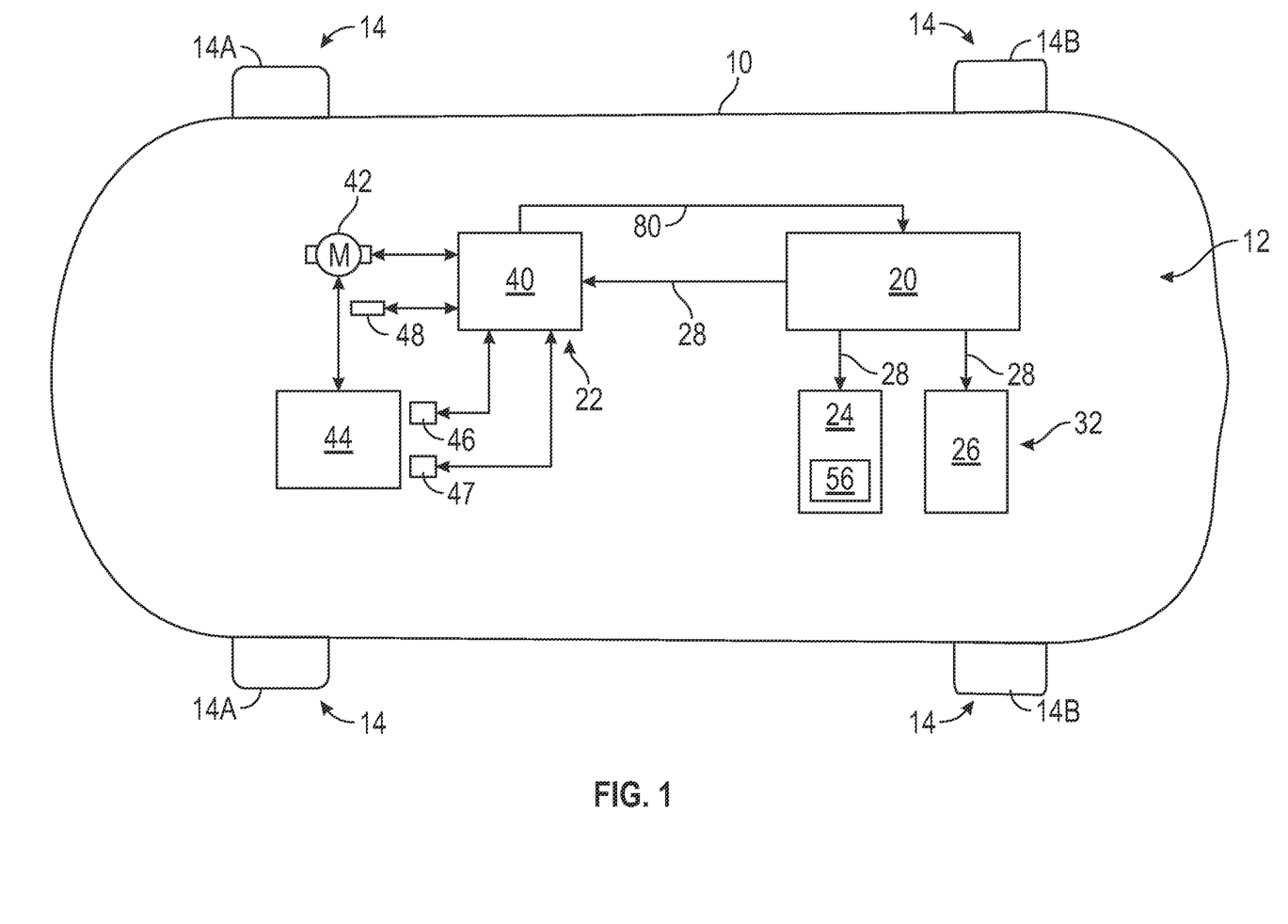
FIG. 1 is a schematic illustration of a vehicle including the disclosed control allocation system including one or more controllers in electronic communication with an electric power steering (EPS) system, an active rear steering (ARS) system, and a combined torque vectoring (TV) and differential braking (DB) system, according to an exemplary embodiment.

Referring to FIG. 1, a schematic diagram illustrating an exemplary vehicle 10 including a control allocation system 12 for providing control to a plurality of wheels 14 is shown. The control allocation system 12 includes one or more controllers 20 in electronic communication with an electric power steering (EPS) system 22 and one or more redundant actuation systems 32. Specifically, in an embodiment, the redundant actuation systems 32 include an active rear steering (ARS) system 24, a combined torque vectoring (TV) and differential braking (DB) system 26, or both an ARS system 24 and the combined TV and DB system 26. The EPS system 22 steers a pair of front wheels 30A of the vehicle 10, and the one or more redundant actuation systems 32 provide control to either the rear wheels 30B or both the front wheels 30A and the rear wheels 30B of the vehicle 10. As explained in detail below, the one or more controllers 20 send control actions 28 for instructing the actuators associated with the EPS system 22, the ARS system 24, and the combined TV and DB system 26 to guide the vehicle 10 along a planned path of travel 16 (FIG. 2) when the EPS system 22 is non-functional by steering the wheels 30.

The EPS system 22 includes an EPS controller 40 in electronic communication with an electric motor 42, a steering torque sensor 46, a steering angle sensor 47, and a steering motor sensor 48. The electric motor 42 provides assist torque to a steering system 44. The steering system 44 includes numerous gears, linkages, and other components for controlling a front road wheel angle δf the front wheels 30A of the vehicle 10. The ARS system 24 includes rear wheel steering actuators 56 for controlling a rear road wheel angle δr of the rear wheels 30B of the vehicle 10 independently of a driver input. The torque vectoring system of the combined TV and DB system 26 differentially applies torque from an engine or motor (not shown) to the plurality of wheels 30 of the vehicle 10, and a differential braking system independently varies a braking force to the wheels 30 of the vehicle 10.

Figure 2:
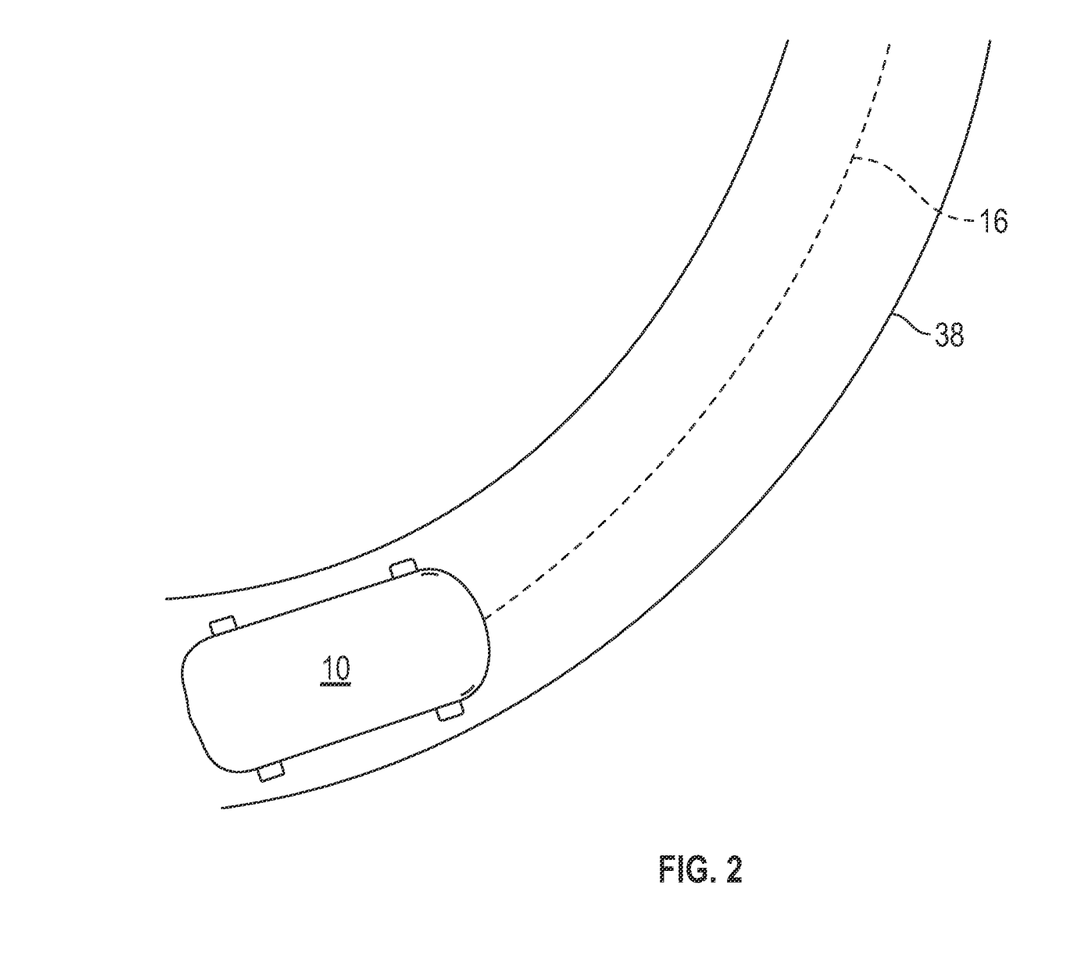
FIG. 2 is a diagram illustrating a planned path of travel for the vehicle shown in FIG. 1, according to an exemplary embodiment.

FIG. 2 is a diagram illustrating the vehicle 10 traveling along a roadway 38 while following the planned path of travel 16. Referring to FIGS. 1 and 2, in the event the EPS system 22 becomes non-functional, the vehicle 10 may deviate from the planned path of travel 16. For example, the electric motor 42 of the EPS system 22 may not be able to provide assist torque because of excessive heat or infiltration of water, dirt, or other contaminants. As explained in detail below, the disclosed control allocation system 12 delivers the control actions 28 in real-time to instruct the one or more redundant actuation systems 32 on-board the vehicle 10 (i.e., the rear wheel steering actuators 48 of the ARS system 24 and/or the combined TV and DB system 26) to guide the vehicle 10 along the planned path of travel 16.

The vehicle 10 may be any type of vehicle such as, but not limited to, a sedan, truck, sport utility vehicle, van, or motor home. In one non-limiting embodiment, the vehicle 10 may be a fully autonomous vehicle including an automated driving system (ADS) for performing all driving tasks or, alternatively, a semi-autonomous vehicle including an advanced driver assistance system (ADAS) for assisting a driver with steering, braking, and/or accelerating. However, it is to be appreciated that in another embodiment the vehicle 10 may be a non-autonomous or manually driven vehicle as well.

Figure 3:
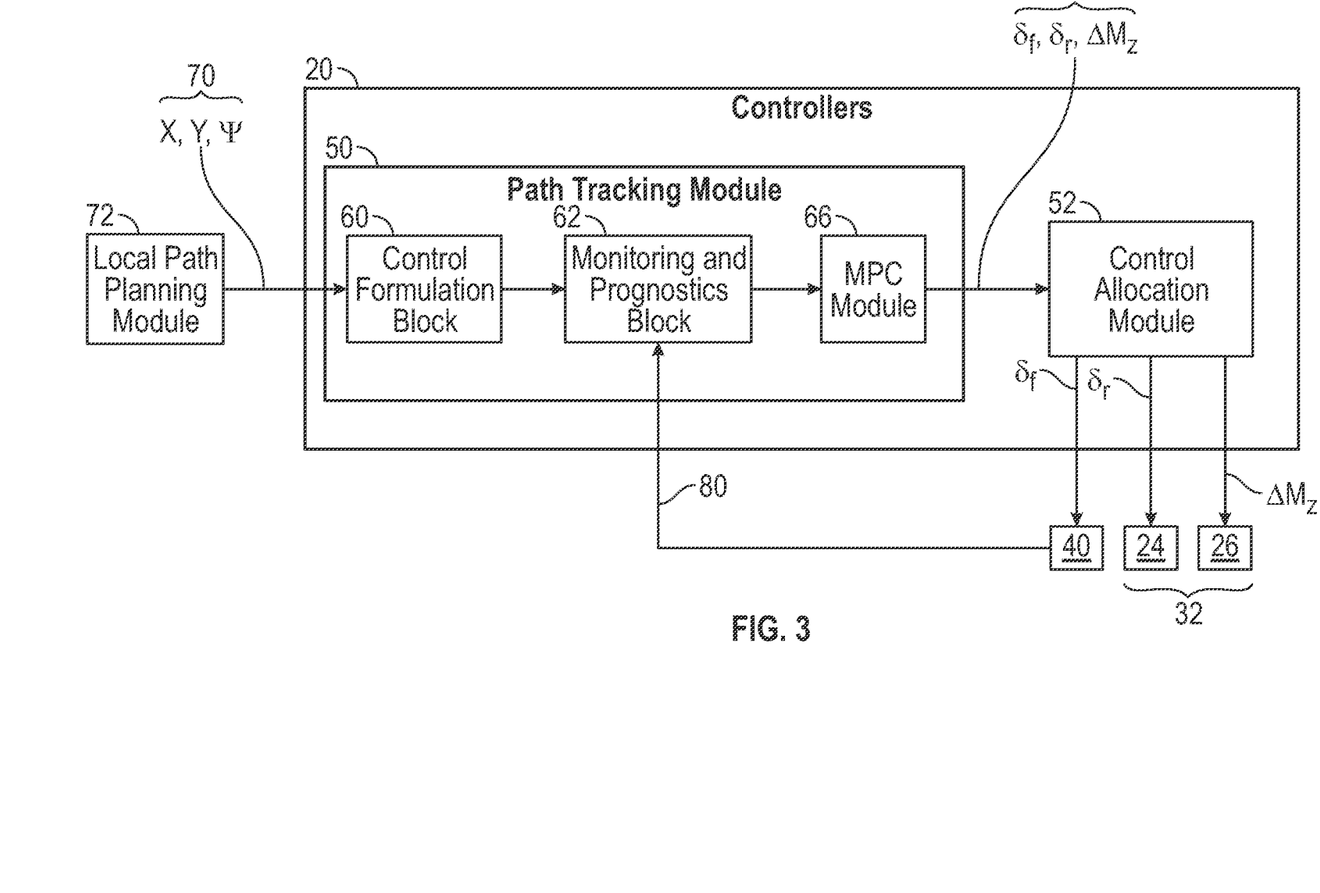
FIG. 3 is a block diagram of the one or more controllers shown in FIG. 1 for determining control actions that are distributed to one or more redundant actuation systems that are part of the vehicle, according to an exemplary embodiment.

FIG. 3 is a block diagram of the one or more controllers 20. The one or more controllers 20 include a path tracking module 50 and a control allocation module 52. The path tracking module 50 determines the control actions 28 that are sent to the control allocation module 52. The control actions 28 include the front road wheel angle δf, the rear road wheel angle δr, and an external yaw moment at a center of gravity $\Delta M_z$. The path tracking module 50 includes a control formulation block 60, an EPS monitoring and prognostics block 62, an actuator constraint block 64, and a model predictive control (MPC) block 66. It is to be appreciated that the control formulation block 60 determines an actuator Boolean matrix offline, however, the remaining blocks 62, 64, 66 are executed in real-time.

Referring to FIGS. 1 and 3, the control formulation block 60 receives a plurality of local path planning references 70 from a local path planning module 72 that is part of the vehicle 10 (FIG. 1). The plurality of local path planning references 70 include vehicle position coordinates X, Y and the vehicle heading angle Ψ. The control formulation block 60 determines the actuator Boolean matrix indicating a specific actuator control configuration of the vehicle 10. The specific actuator control configuration indicates one or more actuators available on-board the vehicle 10 for guiding the vehicle 10 along the planned path of travel 16 (FIG. 2) when the EPS system 22 is non-functional by steering the wheels 30. Specifically, the control formulation block 60 first determines tracking errors and vehicle dynamics states based on the plurality of local path planning references 70. The tracking errors include a lateral distance error $e_y$ and a heading orientation error $e_\Psi$, and the vehicle dynamics states include vehicle lateral speed and yaw rate. The control formulation block 60 may then determine a state space formulation based on the tracking errors, the vehicle dynamics states, and a lateral tire force. The lateral tire force may be performed based on various approaches such as, for example, the Fiala brush tire model or the affine tire model.

The state space formulation includes high-level control variables and the actuator Boolean matrix and is expressed in Equations 1, 2, 3, and 4 as:

$$\dot{x} = \bar{A}_c x + \bar{B}_c B_\alpha v + \bar{d}_c$$

$$y = \bar{C}_c x$$

$$x = [e_y \; v_y \; e_\Psi \; r]^T \quad \text{Equation 3}$$

$$y = [e_y \; e_\Psi]^T \quad \text{Equation 4}$$

where v is a vector containing the high-level control variables, $\bar{A}_c$ is a system matrix, $\bar{B}_c$ is a control input matrix, $\bar{d}_c$ is an additional term with the estimation of lateral tire forces and cornering stiffness, $\bar{C}_c$ is an output matrix, and $B_\alpha$ is the actuator Boolean matrix. The vector of the high level control variable v is determined based on the one or more redundant actuation systems 32 on-board the vehicle 10 for guiding the vehicle 10 along the planned path of travel 16 (FIG. 2) when the EPS system 22 is non-functional, which is shown in Table 1 and explained in greater detail below.

Continuing to refer to FIGS. 1 and 3, the actuator Boolean matrix indicates the one or more redundant actuation systems 32 available in the vehicle 10 for steering the wheels 30 the vehicle 10 when the EPS system 22 is non-functional. For example, the vehicle 10 may include the EPS system 22, the ARS system 24, and the combined TV and DB system 26. In this example, the actuator Boolean matrix listed in row 1 of Table 1 (shown below) would be selected. Alternatively, the vehicle 10 may only include the EPS system 22 and the ARS system 24, and the actuator Boolean matrix in row 2 of Table 1 is used. In another example, the vehicle 10 only includes the EPS system 22 and the combined TV/DB system 26, and the actuator Boolean matrix in row 3 is used.

TABLE 1

| Row | Configuration | Actuator Boolean Matrix | High-Level Control Variable Vector |
|---|---|---|---|
| 1 | EPS 22 + ARS 24 + TV/DB 26 | $B_a = \begin{bmatrix} 1 & 0 & 0 \\ 0 & 1 & 0 \\ 0 & 0 & 1 \end{bmatrix}$ | $v = [\delta_f \; \delta_r \; \Delta M_z]^T$ |
| 2 | EPS 22 + ARS 24 | $B_a = \begin{bmatrix} 1 & 0 \\ 0 & 1 \\ 0 & 0 \end{bmatrix}$ | $v = [\delta_f \; \delta_r]^T$ |
| 3 | EPS 22 + TV/DB 26 | $B_a = \begin{bmatrix} 1 & 0 \\ 0 & 0 \\ 0 & 1 \end{bmatrix}$ | $v = [\delta_f \; \Delta M_z]^T$ |

Referring to FIGS. 1 and 3, the EPS monitoring and prognostics block 62 of the path tracking module 50 monitors the EPS controller 40 in real-time for a fault signal 80 that indicates the EPS system 22 is non-functional. In an embodiment, the fault signal 80 includes a fault code signifying a condition causing the EPS system 22 to become non-functional. In an embodiment, the fault signal 80 includes one or more of the following: an EPS fault flag, an EPS faulty mode message, a faulty steering angle message, and EPS operating bounds message. The EPS fault flag may indicate that the EPS system 22 is malfunctioning by outputting a false valve such as, for example, 0. The EPS faulty mode message may indicate for example, that there is a steering jam. The faulty steering angle message indicates a current steering angle measurement when in jam mode or real-time steering changes when in a free rotation mode.

During normal operation of the EPS system 22, the actuator constraint block 64 determines standard constraints, which include an equality constraint and a bound constraint. Standard operation refers to operating conditions where the EPS system 22 is functional (i.e., the EPS controller 40 has not generated the fault signal 80). Specifically, in an embodiment, the equality constraint is expressed in Equation 5, and the bound constraint is expressed in Equation 6 as:

$$Av = b \quad \text{Equation 5}$$

$$lb \leq v \leq ub \quad \text{Equation 6}$$

where A is a predetermined coefficient, b is a set value based on the assumption the EPS system 22 operates as a primary actuation system for steering the front wheels 30A of the vehicle 10 (FIG. 1) along the planned path of travel 16 (FIG. 2), v is the high-level control variable (vector), lb is the lower bound vector for the high-level control variable v, and ub is the upper bound for the high-level control variable v. In embodiments, during normal operation, entries of the upper bound ub and the lower bound lb corresponding to the ARS system 24 and the combined TV and DB system 26 are set to zero to deactivate the ARS system 24, the combined TV and DB system 26, or both.

In response to receiving the fault signal 80 indicating the EPS system 22 is non-functional from the EPS monitoring and prognostics block 62, the actuator constraint block 64 determines a plurality of corrective constraints for controlling the EPS system 22 and the one or more redundant actuation systems 32. The plurality of corrective constraints are determined based on the high-level control variable and the actuator Boolean matrix. The plurality of corrective constraints includes a corrective equality constraint and a corrective bound constraint. Specifically, in an embodiment, the equality constraint is expressed in Equation 7, and the bound constraint is expressed in Equation 8 as:

$$Av = b_f \qquad \text{Equation 7}$$

$$lb_f \leq v \leq ub_f \qquad \text{Equation 8}$$

where A is the predetermined coefficient, $b_f$ is the set value based on the one or more redundant actuation systems 32 available in the vehicle 10 for steering the wheels 30 the vehicle 10 when the EPS system 22 is non-functional, v is the high-level control variable, $lb_f$ is the lower bound vector for the high-level control variable v, and $ub_f$ is the upper bound vector for the high-level control variable v. The corrective equality constraint may be fixed at a constant value, for example, in the jam mode, and is used by the EPS system 22. The lower bound vector $lb_f$ and the upper bound vector $ub_f$ indicate the limits of the control variable v (e.g. a front steering angle in a nonfunctional condition, rear steering angle, and external yaw moment), where the limits may be determined by physical capacity. These lower bound vector $lb_f$ and the upper bound vector $ub_f$ are part of an MPC optimization problem and guarantee the control actions 28 generated by the MPC module 66 are feasible. The corrective constraints are then sent to the MPC module 66.

The MPC module 66 is able to determine the EPS system 22 is non-functional in real-time, since the corrective constraints are sent to the MPC module 66 in real-time. Thus, the MPC module 66 updates the control actions 28 in real-time, which in turn allows for the control allocation module 52 to distribute the control actions 28 to the one or more redundant actuation systems 32 to guide the vehicle 10 along the planned path of travel 16 in real-time as well. Specifically, the MPC module 66 receives the corrective constraints (i.e., the corrective equality constraint and the corrective bound constraint) and the tracking errors (i.e., the lateral distance error $e_y$ and the heading orientation error $e_\psi$). The MPC block 66 solves a real-time constrained optimization problem for each sampling interval of the control allocation system 12 to determine the control actions 28 based on the corrective constraints and the tracking errors. In an embodiment, the control actions 28 include the front road wheel angle δf, the rear road wheel angle δr, and the external yaw moment at a center of gravity $\Delta M_z$. It is to be appreciated that the MPC module 66 executes a cost minimizing control strategy to track a current path the vehicle 10 is travelling when the EPS system 22 is non-functional, while complying with the corrective constraints, to determine updated control and predicted vehicle states, and path states.

The MPC block 66 may then transmit the control actions 28 to the control allocation module 52, and the control allocation module 52 distributes the control actions 28 to the one or more redundant actuation systems 32 to guide the vehicle 10 along the planned path of travel 16 (FIG. 2) by steering the wheels 30. Specifically, the front road wheel angle δf is sent to the EPS system 22, the rear road wheel angle δr is sent to the ARS system 24, and the external yaw moment at a center of gravity $\Delta M_z$ is sent to the combined TV and DB system 26. In embodiments, the external yaw moment at a center of gravity $\Delta M_z$ is converted into differential torque commands that are applied to the wheels 30A, 30B of the vehicle 10 (FIG. 1) in the event a torque vectoring system is included, and independent braking forces in the event a differential braking system is included.

Figure 4:
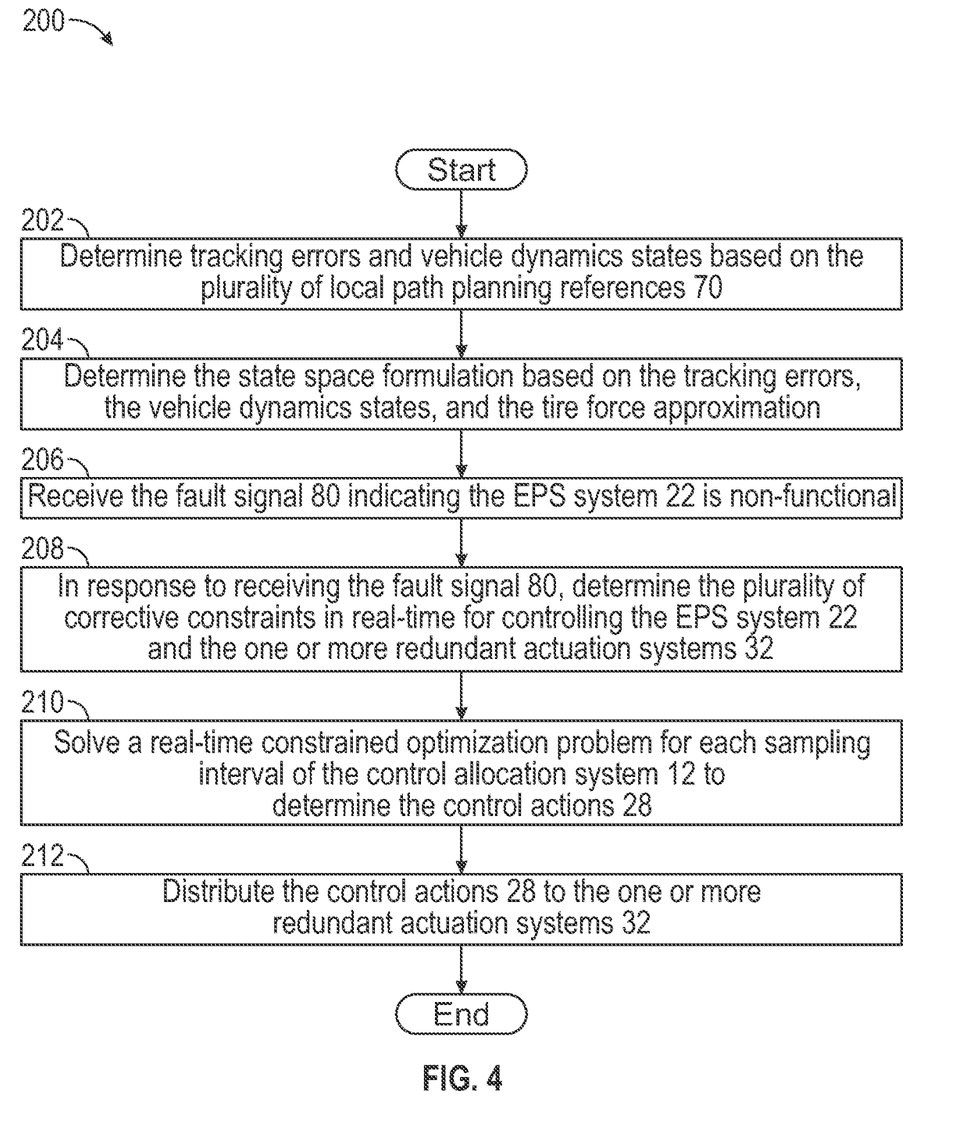
FIG. 4 is a process flow diagram illustrating a method of determining control actions for guiding the vehicle along the planned path of travel shown in FIG. 2, according to an exemplary embodiment.

FIG. 4 is a process flow diagram illustrating an exemplary method 200 for determining the control actions 28 for guiding the vehicle 10 along the planned path of travel 16 (FIG. 2). Referring generally to FIGS. 1-4, the method 200 may begin at block 202. In block 202, the control formulation block 60 determines tracking errors and vehicle dynamics states based on the plurality of local path planning references 70. As mentioned above, the tracking errors include the lateral distance error $e_y$ and the heading orientation error $e_\psi$, and the vehicle dynamics states include vehicle lateral speed and yaw rate. The method 200 may then proceed to block 204.

In block 204, the control formulation block 60 determines the state space formulation based on the tracking errors, the vehicle dynamics states, and the tire force approximation. The state space formulation indicates the high-level control variable v and the actuator Boolean matrix. The method 200 may then proceed to block 206.

In block 206, the EPS monitoring and prognostics block 62 of the path tracking module 50 receives the fault signal 80 indicating the EPS system 22 is non-functional. The method 200 may then proceed to block 208.

In block 208, in response to receiving the fault signal 80, the actuator constraint block 64 of the path tracking module 50 determines the plurality of corrective constraints in real-time for controlling the EPS system 22 and the one or more redundant actuation systems 32. The method 200 may then proceed to block 210.

In block 210, the MPC module 66 of the path tracking module 50 solves a real-time constrained optimization problem for each sampling interval of the control allocation system 12 to determine the control actions 28 based on the plurality of corrective constraints and the tracking errors. The method 200 may then proceed to block 212.

In block 212, the control allocation module 52 distributes the control actions 28 to the one or more redundant actuation systems 32. The method 200 may then terminate or, alternatively, return to block 202.

Referring generally to the figures, the disclosed control allocation system provides various technical effects and benefits by addressing the path tracking discrepancy that may occur when the EPS system is non-functional by leveraging redundant existing actuators. Specifically, the disclosed control allocation system operates to update the control actions in real-time in response to determining a fault within the EPS system. Furthermore, the disclosed control allocation system includes a reconfigurable multi-layer structure that adapts to various actuator configurations. Specifically, the actuator Boolean matrix may be used to accommodate various types of actuator configurations. While the control allocation system is especially advantageous for autonomous and semi-autonomous vehicles, the control actuation system may also be used as steering backup control for a manually driven vehicle as well.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control allocation system for a vehicle including an electric power steering (EPS) system, the control allocation system including:
   one or more redundant actuation systems for controlling a plurality of wheels of the vehicle; and
   one or more controllers in electronic communication with the EPS system and the one or more redundant actuation systems, wherein the one or more controllers execute instructions to:
      determine tracking errors and vehicle dynamics states based on a plurality of local path planning references;
      receive a fault signal indicating the EPS system is non-functional;
      in response to receiving the fault signal, determine a plurality of corrective constraints in real-time for controlling the EPS system and the one or more redundant actuation systems;
      solve a real-time constrained optimization problem for each sampling interval of the control allocation system to determine a plurality of control actions based on the plurality of corrective constraints and the tracking errors;
      distribute the plurality of control actions to the one or more redundant actuation systems; and
      determine a state space formulation based on the tracking errors, the vehicle dynamics states, and a tire lateral force, wherein the state space formulation includes high-level control variables and an actuator Boolean matrix.

2. The control allocation system of claim 1, wherein the actuator Boolean matrix indicates the one or more redundant actuation systems available in the vehicle for guiding the vehicle when the EPS system is non-functional.

3. The control allocation system of claim 1, wherein the plurality of corrective constraints are determined based on the high-level control variable.

4. The control allocation system of claim 1, wherein the fault signal includes a fault code signifying a condition that caused the EPS system to become non-functional.

5. The control allocation system of claim 4, wherein the fault signal includes one or more of the following: an EPS fault flag, an EPS faulty mode message, a faulty steering angle message, and EPS operating bounds message.

6. The control allocation system of claim 1, wherein the plurality of corrective constraints include a corrective equality constraint and a corrective bound constraint.

7. The control allocation system of claim 1, wherein the one or more redundant actuation systems for controlling a plurality of wheels of the vehicle include at least one of the following: an active rear steering (ARS) system, a combined torque vectoring (TV) and differential braking (DB) system, or both the ARS system and the combined TV and DB system.

8. The control allocation system of claim 1, wherein the tracking errors include a lateral distance error and a heading orientation error, and the vehicle dynamics states include vehicle lateral speed and yaw rate.

9. The control allocation system of claim 1, wherein the plurality of control actions include a front road wheel angle, a rear road wheel angle, and an external yaw moment at a center of gravity of the vehicle.

10. The control allocation system of claim 9, wherein the external yaw moment at a center of gravity is converted into differential torque commands that are applied to wheels of the vehicle.

11. The control allocation system of claim 1, wherein the plurality of control actions instructing the one or more redundant actuation systems to guide the vehicle along a planned path of travel when the EPS system is non-functional.

12. A method of determining control actions for guiding a vehicle along a planned path of travel by a control allocation system, the method comprising:
   determining, by one of more controllers of the vehicle, tracking errors and vehicle dynamics states based on a plurality of local path planning references;
   receiving, by the one or more controllers, a fault signal indicating an electric power steering (EPS) system is non-functional;
   in response to receiving the fault signal, determining a plurality of corrective constraints in real-time for controlling the EPS system and one or more redundant actuation systems;
   solving a real-time constrained optimization problem for each sampling interval of the control allocation system to determine a plurality of control actions based on the plurality of corrective constraints and tracking errors;
   distributing the control actions to one or more redundant actuation systems for controlling a plurality of wheels of the vehicle; and
   determining a state space formulation based on the tracking errors, the vehicle dynamics states, and a tire lateral force approximation, wherein the state space formulation includes high-level control variables and an actuator Boolean matrix.

13. The method of claim 12, wherein the actuator Boolean matrix indicates the one or more redundant actuation systems available in the vehicle for guiding the vehicle when the EPS system is non-functional.

14. A control allocation system for a vehicle including an electric power steering (EPS) system, the control allocation system including:
   one or more redundant actuation systems for controlling a plurality of wheels of the vehicle, wherein the one or more redundant actuation systems include at least one of the following: an active rear steering (ARS) system, a combined torque vectoring (TV) and differential braking (DB) system, and both the ARS system and the combined TV and DB system; and
   one or more controllers in electronic communication with the EPS system and the one or more redundant actuation systems, wherein the one or more controllers execute instructions to:

determine tracking errors and vehicle dynamics states based on a plurality of local path planning references;

determine a state space formulation based on the tracking errors, the vehicle dynamics states, and a tire lateral force, wherein the state space formulation includes high-level control variables and an actuator Boolean matrix;

receive a fault signal indicating the EPS system is non-functional;

in response to receiving the fault signal, determine a plurality of corrective constraints in real-time for controlling the EPS system and the one or more redundant actuation systems;

solve a real-time constrained optimization problem for each sampling interval of the control allocation system to determine a plurality of control actions based on the plurality of corrective constraints and the tracking errors; and distribute the control actions to the one or more redundant actuation systems.

15. The control allocation system of claim 14, wherein the actuator Boolean matrix indicates the one or more redundant actuation systems available in the vehicle for guiding the vehicle when the EPS system is non-functional.

16. The control allocation system of claim 14, wherein the fault signal includes a fault code signifying a condition that caused the EPS system to become non-functional.

17. The control allocation system of claim 16, wherein the fault signal includes one or more of the following: an EPS fault flag, an EPS faulty mode, a faulty steering angle message, and EPS operating bounds message.

18. The control allocation system of claim 14, wherein the plurality of corrective constraints includes a corrective equality constraint and a corrective bound constraint.

19. The control allocation system of claim 14, wherein the plurality of control actions includes a front road wheel angle, a rear road wheel angle, and an external yaw moment at a center of gravity of the vehicle.

20. The control allocation system of claim 19, wherein the external yaw moment at a center of gravity is converted into differential torque commands that are applied to wheels of the vehicle.

* * * * *